(12) United States Patent
Froiz Espino (10) Patent No.: US 9,896,270 B2
(45) Date of Patent: Feb. 20, 2018

(54) FLEXIBLE MANUAL STORAGE SYSTEM

(71) Applicant: ESYPRO MANUTENCIÖN S.L.U., Vincios-Gondomar (ES)

(72) Inventor: Jose Luis Froiz Espino, Vincios-Gondomar (ES)

(73) Assignee: ESYPRO MANUTENCIÓN S.L.U., Vincios-Gondomar (ES)

( * ) Notice: Subject to any disclaimer, the term of this patent is extended or adjusted under 35 U.S.C. 154(b) by 0 days.

(21) Appl. No.: 15/312,353

(22) PCT Filed: May 29, 2014

(86) PCT No.: PCT/ES2014/070441
§ 371 (c)(1),
(2) Date: Nov. 18, 2016

(87) PCT Pub. No.: WO2015/181404
PCT Pub. Date: Dec. 3, 2015

(65) Prior Publication Data
US 2017/0107057 A1    Apr. 20, 2017

(51) Int. Cl.
*B65G 9/00* (2006.01)

(52) U.S. Cl.
CPC .............. *B65G 9/002* (2013.01); *B65G 9/008* (2013.01)

(58) Field of Classification Search
CPC ................................. B65G 9/002; B65G 9/008
USPC ...... 198/465.1, 679.1, 681, 683; 104/89, 93, 104/172.1, 172.4
See application file for complete search history.

(56) References Cited

U.S. PATENT DOCUMENTS

| | | | | |
|---|---|---|---|---|
| 3,559,586 A | * | 2/1971 | Follrath | ................ B61B 10/025 104/172.4 |
| 3,661,094 A | * | 5/1972 | Pachuta | ................ B61B 10/046 104/172.3 |
| 3,814,024 A | * | 6/1974 | Peter | ..................... B61B 10/025 104/172.4 |
| 4,228,738 A | * | 10/1980 | Forshee | .................. B61B 12/02 104/95 |

(Continued)

FOREIGN PATENT DOCUMENTS

| | | |
|---|---|---|
| CN | 203651081 | 6/2014 |
| WO | 2010/065612 | 6/2010 |

OTHER PUBLICATIONS

PCT Search Report in PCT/ES2014/070441.

*Primary Examiner* — Douglas Hess
(74) *Attorney, Agent, or Firm* — Greenblum & Bernstein, P.L.C.

(57) ABSTRACT

The invention relates to a flexible manual storage system comprising: a rolling track (3); piece-holding chains (1, 1', 1") formed by a variable number of crossbars (1*a*, 1*b*, 1*c*) provided with through-holes (12) form which pieces can be suspended; shock absorbing end parts (4) and carns (6) for connecting consecutive piece-holding chains (1, 1', 1"); and rolling assemblies (2) provided with a casing (25) having a U-shaped cross-section and equipped with at least one pair of rollers (26) bearing on a guide (31) of a rolling track (3) and with a vertical shaft (21) for supporting the crossbars of a piece-holding chains. The rolling track (3) comprises at least one first segment (3*a*) and one second segment (3*b*) that can be coupled to one another and a station (8) at which successive piece-holding chains can be stopped and disconnected from one another.

10 Claims, 9 Drawing Sheets

(56) References Cited

U.S. PATENT DOCUMENTS

| | | | | |
|---|---|---|---|---|
| 4,389,944 A * | 6/1983 | Linton | B61B 10/025 | 104/172.4 |
| 4,433,627 A * | 2/1984 | Forshee | B61B 13/04 | 104/95 |
| 4,484,525 A * | 11/1984 | Forshee | B61B 13/04 | 104/95 |
| 4,942,956 A * | 7/1990 | Acker | B65G 49/025 | 104/162 |
| 5,014,864 A | 5/1991 | Richter | | |
| 5,209,363 A | 5/1993 | Enderlein | | |
| 5,231,932 A * | 8/1993 | Enderlein | B61B 10/025 | 104/162 |
| 5,363,770 A * | 11/1994 | Makimura | B61B 10/025 | 104/172.4 |
| 5,857,556 A * | 1/1999 | Bonacorsi | B65G 17/20 | 198/683 |
| 6,098,695 A * | 8/2000 | Schwingle | E05F 15/605 | 16/87 R |
| 6,125,991 A * | 10/2000 | Veldkamp | A22C 15/001 | 198/678.1 |
| 6,241,082 B1 * | 6/2001 | Vanmeenen | B65G 9/002 | 104/89 |
| 6,374,747 B1 * | 4/2002 | Devnani | B61B 10/025 | 104/162 |
| 6,745,891 B2 * | 6/2004 | Walter | B61B 10/025 | 104/172.4 |
| 6,758,325 B2 * | 7/2004 | Greeley | B61B 3/00 | 198/465.4 |
| 7,334,527 B2 * | 2/2008 | Waldmiller | B61B 10/022 | 104/89 |
| 8,375,516 B2 * | 2/2013 | Baines | E05D 15/0665 | 16/87.4 R |
| 8,944,238 B2 * | 2/2015 | Baechle | B65G 17/485 | 104/106 |
| 2012/0160126 A1 | 6/2012 | Rathbun | | |

* cited by examiner

FLEXIBLE MANUAL STORAGE SYSTEM

OBJECT OF THE INVENTION

The object of this invention is a flexible manual storage system applicable to the maintenance of hanging parts for different types of industry and which makes it possible to combine different stages of the logistic flow, such as production areas, storage areas, processing or consumption areas, and transportation and the connection between these; this system being a totally modular and standardized system that facilitates the correct handling of parts.

FIELD OF APPLICATION OF THE INVENTION

This invention is applicable in all types of industries that require transportation and storage of parts whose characteristics allow them to be hung and transported suspended on a rolling track.

PRIOR ART

A modular system for storage and transportation of parts is described in Spanish patent ES 2296434, from the same applicant as for this invention as well as a method of use. Said modular system comprises a zone of composition consisting of production or parts loading stations to feed transportation cars, a storage area provided with accumulation bars to store parts suspended from workpiece slings, and a consumption area, the flow of the parts being effected between said areas by means of workpiece slings which are transferred and transported by means of rolling tracks provided in the aforementioned areas.

This modular system presents some disadvantages of use such as a limited load capacity of the workpiece slings and the risk of breakage thereof in case of accidental release of the rolling track when the transfer of said workpiece slings from one area to another is performed.

These drawbacks entail the risk of accidents and damage to both materials and persons. It is therefore the object of this invention to develop a flexible manual storage system which solves the aforementioned disadvantages and provides greater safety of use.

DESCRIPTIONS OF THE INVENTION

The flexible manual storage system, which is the object of this invention, comprising a rolling track for suspended movement, along same of workpiece elements includes particularities of construction aimed at solving the aforementioned problem.

For this and in accordance with the invention, this system comprises workpiece chains the characteristics of which make it possible to double the load capacity and to provide greater safety of use, avoiding accidents, for example, in the event of the pick-up of a portion of a workpiece rosary during its transfer between two differentiated zones of the rolling track.

According to the invention, said workpiece chains are constituted by a variable number of crossbars; each workpiece chain may include a single crossbar, or two crossbar ends hinged together, or two crossbar ends and the middle crossbars hinged together.

At least one part of the chains comprise two end crossbars made up of a metal tube provided with: a few through-holes upon which to hang the parts to be transported and stored; a first free end carrying shock absorbing end parts and a cam linking consecutive chains and a second end in which a support and stiffening tab is defined and which is placed vertically from a metal hinged part that is attached to said second end of the metal tube; defining said support and stiffening tabs of the hinged metal parts on the end crossbars makes it possible for said hinged parts to support a heavy load without breaking or releasing the load from said end crossbars.

Each hinged metal part contains a vertical opening to be coupled to a similar hinged metal part, corresponding to a crossbar adjacent to the chain by means of an associated vertical rotary shaft for support, which is associated with a rolling assembly mounted in a suspended position and that has the possibility of lengthwise movement along a rolling track. Incorporating two linking cams in the crossbar ends of the workpiece chains makes it possible to temporarily join successive workpiece chains so that they may move together along the rolling track and each of the chains may later be released as they reach a certain area for storage, use, or transportation of the parts mounted thereupon.

This system further comprises rolling assemblies provided with a "U"-shaped housing section which carries at least one pair of support and movement rollers on a rolling track guide, and a vertical support shaft for the adjacent crossbars by metal hinged parts and the first free end of the crossbar ends.

The part-holding chains may comprise, in addition to the crossbar ends mentioned above, a few middle crossbars, also constructed of metal tubes that, in this case, each have support and stiffening tabs on their opposing ends, vertically positioned, of hinged metal parts, similar to those in the crossbar ends and attached to the respective ends of the corresponding tube.

The forming of the hinged parts from a metal material and the reinforcement provided by the support and stiffening tabs defined in both the crossbar ends and the middle crossbars ensure that the chain has a high load capacity and provides a high level of safety against breakage during use.

To ensure a proper union, with a rotational ability, the vertical shaft of the rolling carts that create its union with rotational ability, in its lower end there is an opening to mount, by means of a pin, a support bushing for the chain crossbars between the metal hinged parts of the crossbar ends with respect to each other or with respect to the middle crossbars.

In this invention, the chains are provided with riveted bolts at the opposite ends, which protrude laterally from the crossbar ends and which form stops for the moving chains on the rolling track.

According to the invention, the system also comprises some part-holding chains constituted by a single crossbar made from a metal tube the ends of which have shock absorbing end parts and linking cams mounted on their respective rolling assemblies.

In accordance with the invention, the rolling track includes at least one first section and a second section enabled with relative movement between an unlinked position and a linked position in an axial direction upon which a continuous track is defined for the passage of successive chains from the first to the second section of the rolling track. In this case, a stop and unlinking station for the successive chains has been provided for on at least the first section of the rolling track which includes an end that couples to the second section. This would be done prior to its access to the second section of the rolling track. This makes it possible for operators to separate or free the successive sections to handle or remove the parts suspended thereupon.

In accordance with the invention, the stopping and linking station comprises a support with an end stop in the first section of the rolling track, making toggling possible with respect to a shaft between an operational position in which it acts against a bolt in the first chain in circulation, preventing passage thereof towards the second section of the rolling track, and an inoperative position in which it does not interfere with the bolt of said first chain allowing the passage thereof towards the second section of the track.

Said support also contains an unlinking stop that is pivotable with respect to a rotating shaft, which makes an appendage of the unlinking stop that acts against a linking cam on the first chain in circulation towards the second section of the rolling track causing an unlinking of the first chain with respect to the second chain. The aforementioned unlinking stop further has a detent and a bolt bumper on the second chain in circulation preventing it from passing along with the first chain towards the second section of the rolling track.

In the second section of the rolling track, this chain stopping and unlinking station comprises a fixed stop that positions the end stop in an inoperable position when the first section of the rolling track is coupled to the second section of the rolling track.

DESCRIPTION OF THE FIGURES

In order to supplement the description being made and for the purpose of helping to provide better comprehension of the invention's characteristics, as an integral part of said description a set of drawings is attached as non-restrictive illustrative examples, in which the following are shown.

PREFERRED EMBODIMENT OF THE INVENTION

Figure 1:
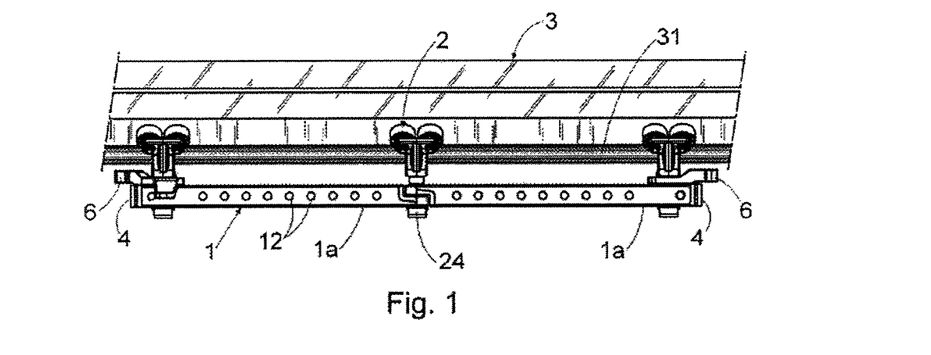
FIG. 1 shows a raised view of an example of an embodiment of the flexible manual storage system according to the invention in which a workpiece chain formed by two end crossbars can be seen.

In the example of the embodiment shown in FIG. 1 a workpiece chain (1) is shown constituted by two crossbar ends (1a) and that is mounted by means of a few rolling assemblies (2) on a guide (31) of a rolling track (3), the crossbar ends (1a) are made of a metal tube (11) having transverse openings (12) upon which to hang the parts to be transported.

The metal tube (11) of the crossbar ends (1a) incorporates an end part (4) on a first end (13) to absorb possible impacts between successive piece-holding chains; is defined at the second end of the metal tube (11) a tab (15) for support and stiffening in the vertical direction of a metal hinged part (5) which is attached to the second end (14) of the metal tube (11) of the corresponding end cross member (1a).

Figure 4:
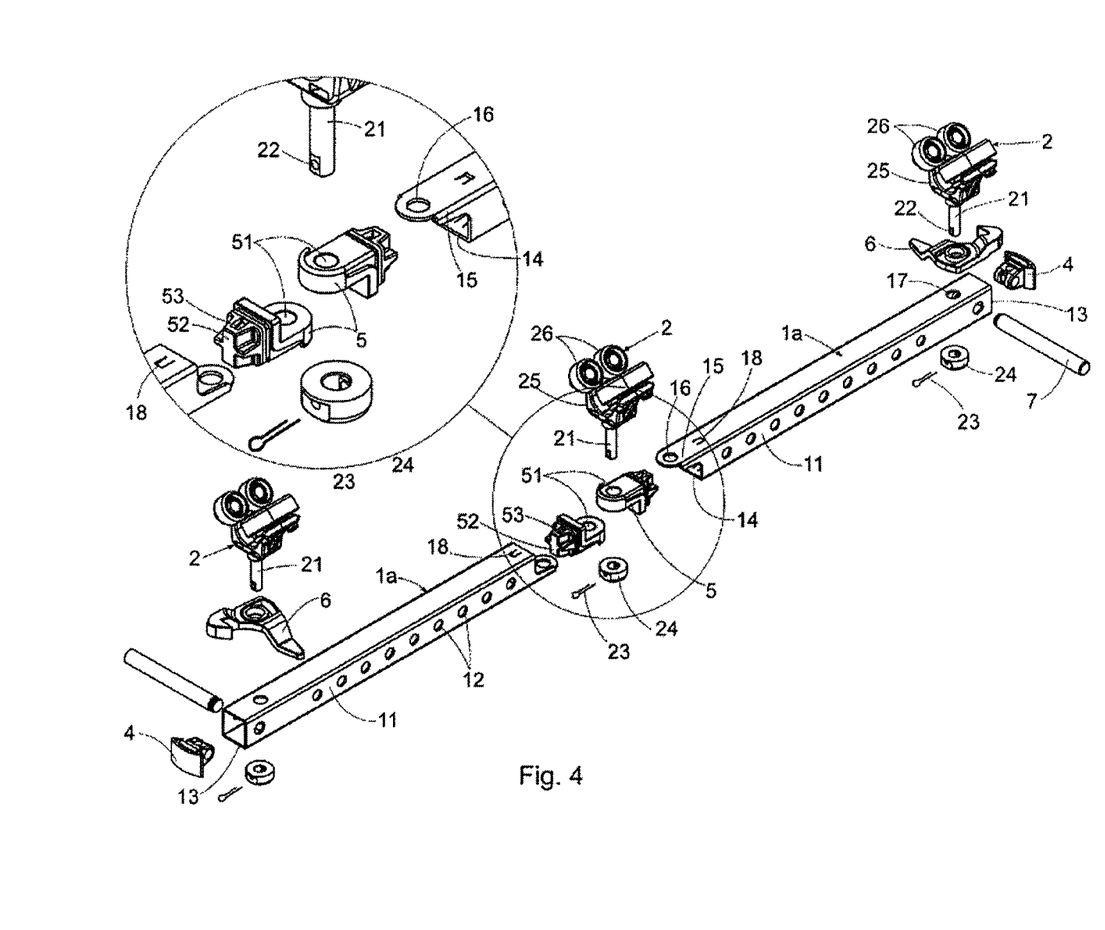
FIG. 4 shows an exploded view in perspective of the workpiece chain of FIG. 3 in which two different elements conforming thereto may be seen.

The hinged metal parts (5) and the respective tabs (15) of the metal tube (1) have vertical openings (51, 16) respectively for through-hole mounting of a vertical shaft (21) of one of the rolling assemblies (2) that, as can be seen in FIG. 4, has a transverse opening (22) on its lower end for mounting by means of a support bushing (24) pin (23) for the chain.

This vertical shaft (21) enables the relative rotation of the crossbar ends (1a) so that the chain may move over the curved sections of the rolling track.

As can be seen in FIG. 4, the metal tube (11) of the crossbar ends (1a) has a vertical opening (17) in an area close to its first end (13), for mounting of a respective rolling assembly similar to that described above.

On the vertical shaft (21) of the rolling assemblies (2) that support the opposite ends of the chain are mounted a few linking cams (6) facilitated by unreferenced torsion springs and that enable the linking and unlinking of the consecutive workpiece chains (1).

The opposite ends of the workpiece chain (1) have a few bolts (7) which are laterally fixed by riveting on the crossbar ends, said bolts conform stops for the movement of the chains in different areas or sections of the rolling track (3).

Figures 2, 3:
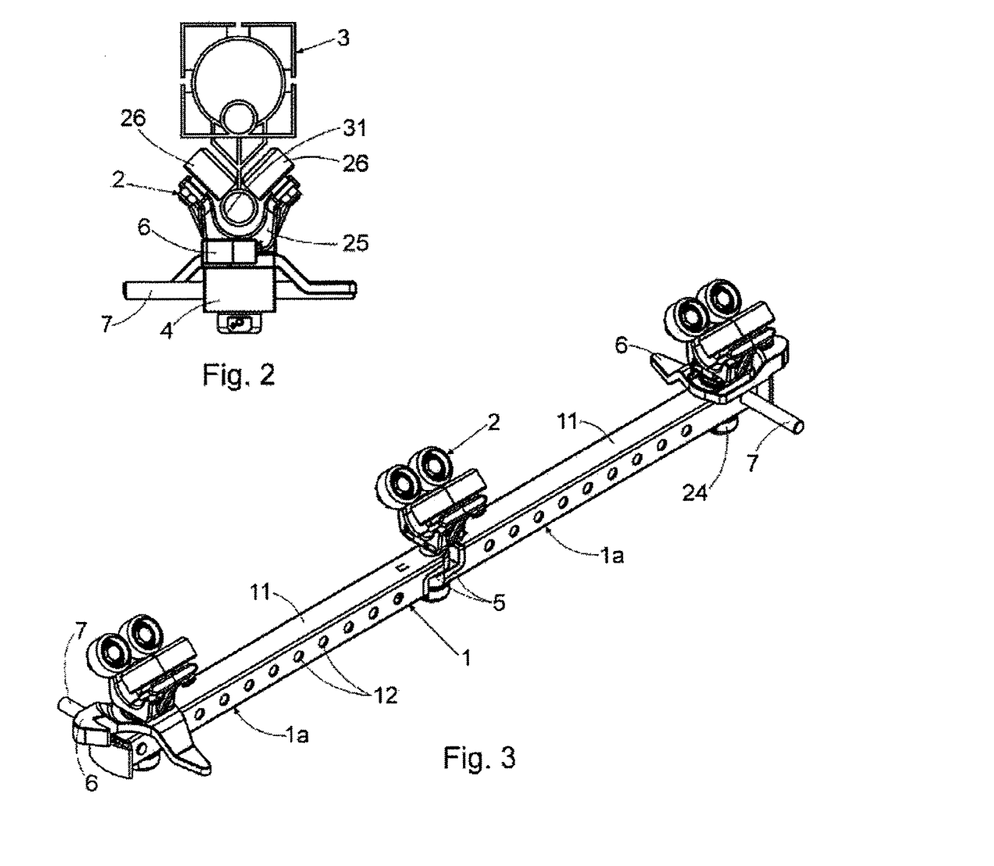
FIG. 2 shows a profile view of the system of FIG. 1.
FIG. 3 shows a view in perspective of the workpiece chain from the above Figures.

The rolling assemblies comprise a "U"-shaped housing (25) integral with the vertical shaft (21) and superiorly it has two pairs of support rollers (26) on the guide (31) of the rolling track (3) as shown for example in FIGS. 1 and 2.

In the example shown in FIG. 4, the hinged metal parts (5) have at their posterior end an appendage (52) for coupling it to the second end (14) of the corresponding metal tube (11).

This appendage (52) is provided with some recesses (53) to accommodate a retaining flange (18) defined for that purpose on the metal tube (11).

Figure 5:
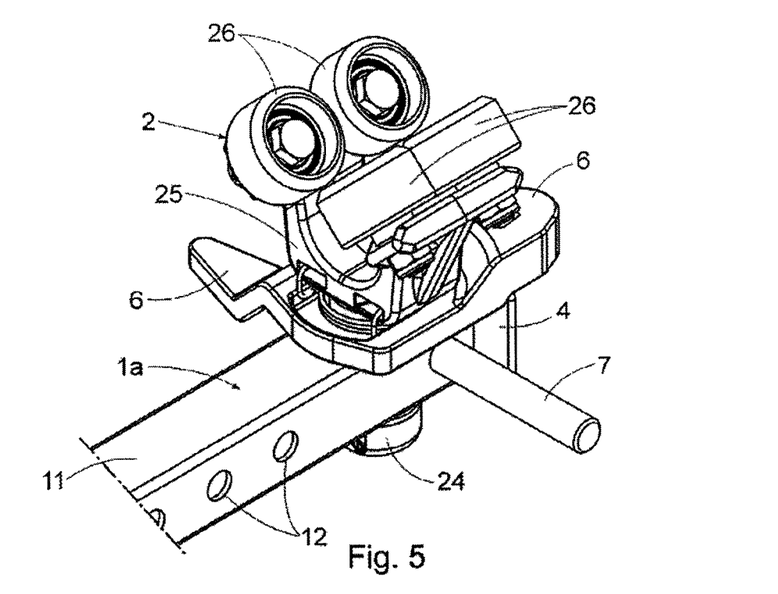
FIGS. 5 and 6 each show enlarged details of FIG. 3 in which a rolling assembly mounted on the free end of a crossbar and the rolling assembly mounted on the hinged area of the two crossbar ends may respectively be seen.
Figure 6:
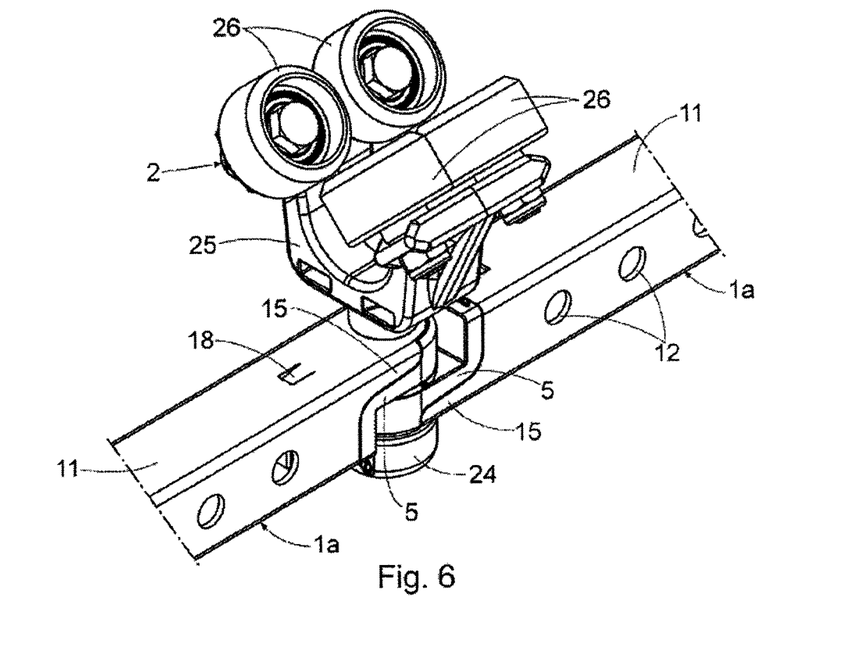

In FIGS. 5 and 6 it is possible to see some enlargements of the details of an end area and a middle area of the chain (1) of FIG. 3, in which the respective rolling assemblies (2) supporting the chain may be seen.

Figure 7:
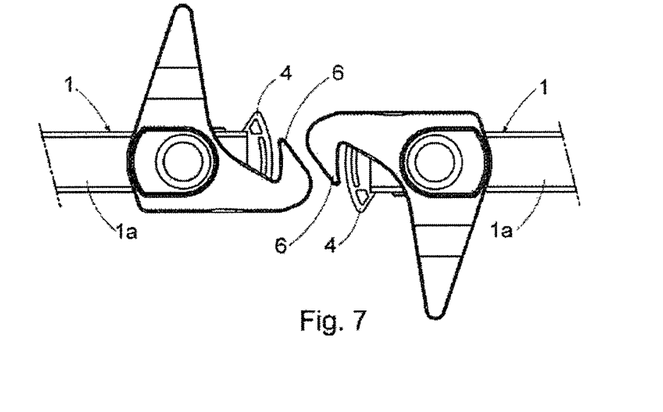
FIG. 7 shows a diagrammatic view as seen from above of the two ends of two consecutive chains in which the respective rolling assemblies have been removed to enable observation of the respective shock absorbing end parts and linking cams.

FIG. 7 diagrammatically shows the ends facing the two workpiece chains (1), eliminating the ends of the rolling assemblies (2) to enable observation of the end parts (4) and linking cams (6) in facing and mutually decoupled positions.

Figure 8:
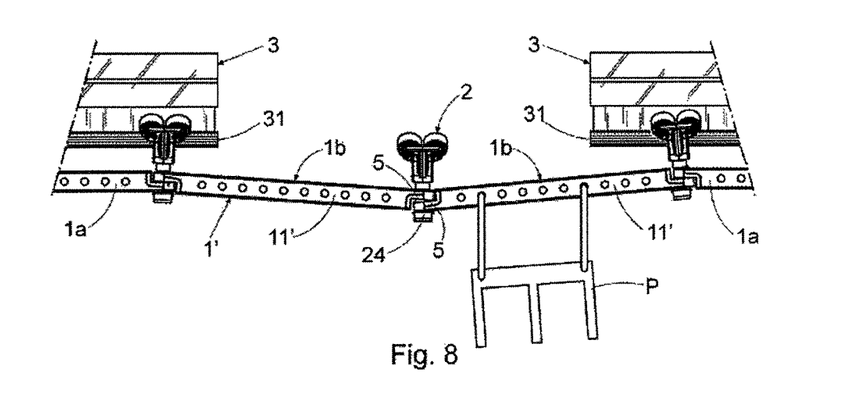
FIG. 8 shows a raised view of a variant of the embodiment of a workpiece chain provided with two crossbar ends and two middle crossbars, with the rolling assembly mounted in the hinged area of said middle crossbars released from the two consecutive sections of the rolling track having been represented.
Figure 9:
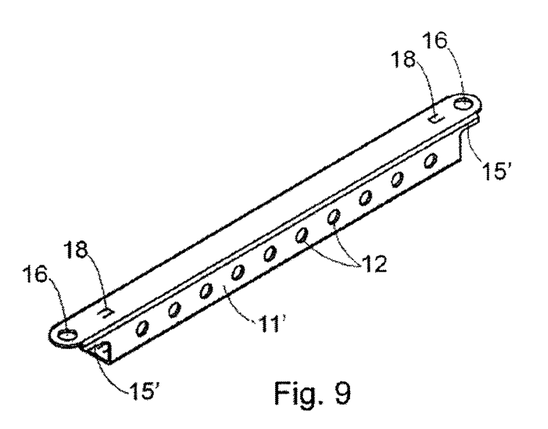
FIG. 9 shows a view in perspective of the metal tube corresponding to one of the middle crossbars of the workpiece chain of the above Figure.

In the embodiment shown in FIG. 8, a workpiece chain (1') may be seen that in addition to two crossbar ends (1a) similar to those mentioned above comprise a few middle crossbars (1b) to create a workpiece chain having a greater length.

The aforementioned middle crossbars are created equally by means of a metal tube (11') similar to that used in the crossbar ends but that has at each of the two opposite ends support and stiffening tabs (15) in a vertical direction to the corresponding hinged metal parts (5).

In this case the chain (1') also features, in the hinged areas of the middle crossbars (1b), the respective rolling assemblies (2).

As shown in FIG. 8, in the case that one portion of the workpiece chain (1') is released from the rolling track (3), for example between two transition areas, the vertical shafts of the rolling assemblies (2) and the hinged metal parts (5), together with the reinforcement provided by the support and stiffening tabs ensure that the chain is able to support the weight of the parts (P) suspended therefrom, without breakage and that it will maintain its integrity.

Figure 10:
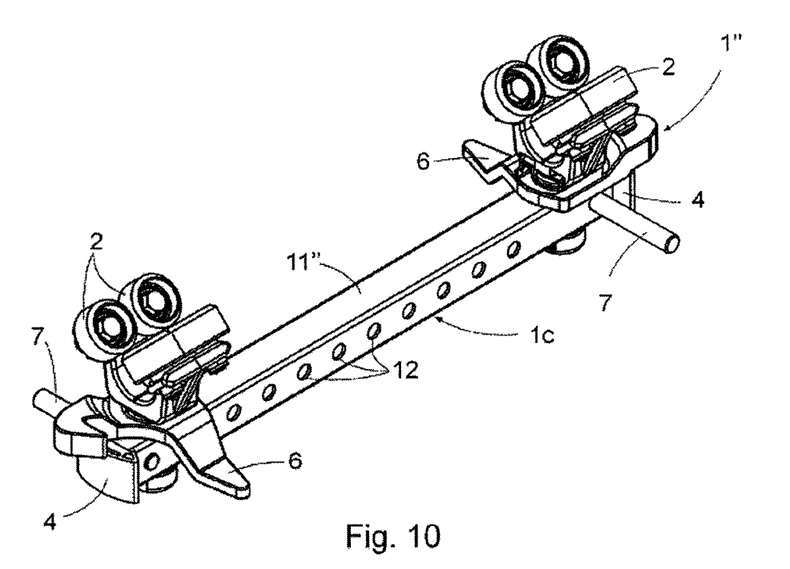
FIG. 10 shows a view in perspective of an example of an embodiment of the chain provided with a single crossbar suspended from two rolling assemblies.

In the example of the embodiment in FIG. 10, a chain (1") may be seen made up of a single crossbar (1c) conformed by a metal tube (11") that in each opposing end has shock absorbing end parts (4) and linking cams (6) mounted on the shaft of each of the rolling assemblies (2).

This chain (1") also features, like those mentioned above, a few lateral riveted bolts (7), that create stops for the movement along the rolling track (3).

Figure 11:
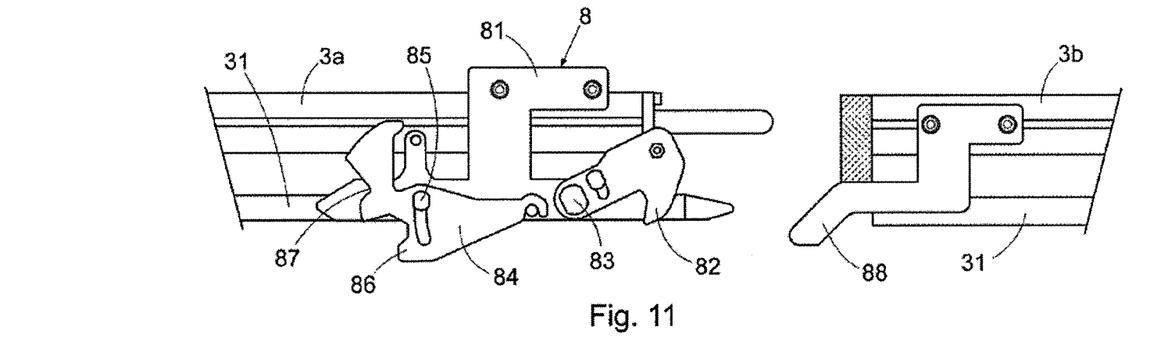
FIG. 11 shows a raised view of an example of an embodiment of a rolling track provided with a first movable section and a second fixed section of a stopping and unlinking station of the chains in circulation on said track.
Figure 12:
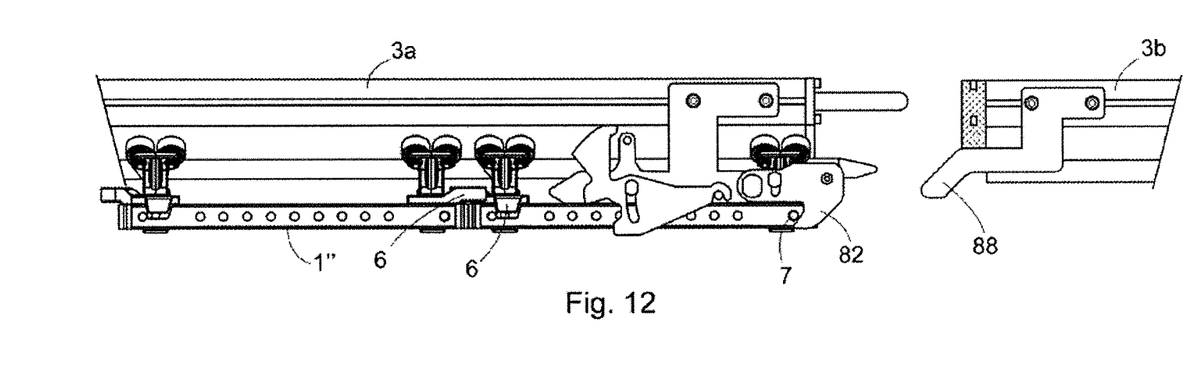
FIGS. 12 to 18 show successive views of the rolling track and the chain stopping and unlinking station in different operational positions that take place when a first chain and a second chain linked by the respective linking cams access said station.
Figure 13:
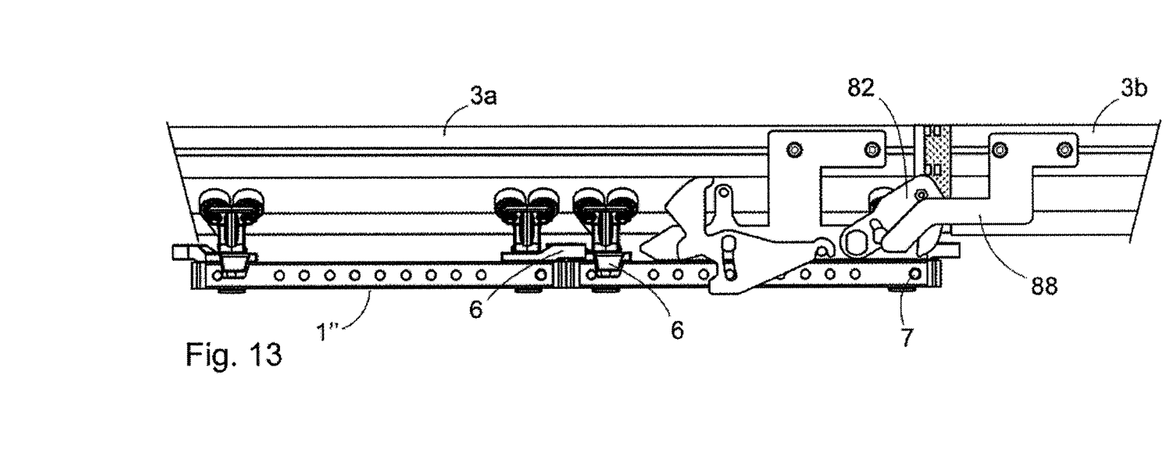

In FIG. 11 an example of an embodiment is shown of a rolling track (3) that comprises a first movable section (3a) and a second fixed section (3b), enabled for relative movement between an uncoupled position shown for example in FIG. 12, and a coupled position in axial direction shown for example in FIG. 13.

In the aforementioned FIG. 11, one may see that the rolling track (3) comprises a stopping and unlinking station (8) of the successive chains that access it joined together by their respective linking cams (6), before said chains access, separate and in individual form, the second section (3b) of the rolling track.

As may be seen in said FIG. 11, the stopping and unlinking station (8) comprises a support (81) fixed to the first section (3a) of the rolling track and a fixed stop (88) mounted on the second section (3b) of the rolling track.

The support (81) comprises an end stop (82) enabled for toggling with respect to a shaft (83) and an pivotable unlinking stop (84) with respect to a shaft (85).

This unlinking stop (84) defines an appendage (86) responsible for acting upon the linking cam (6) of the chains that access thereto, causing the separation of the chain immediately following, and a recess (87) that is responsible for preventing a second chain from separating from a first chain from being moved jointly therewith towards the second section (3b) of the circulation path.

Figure 14:
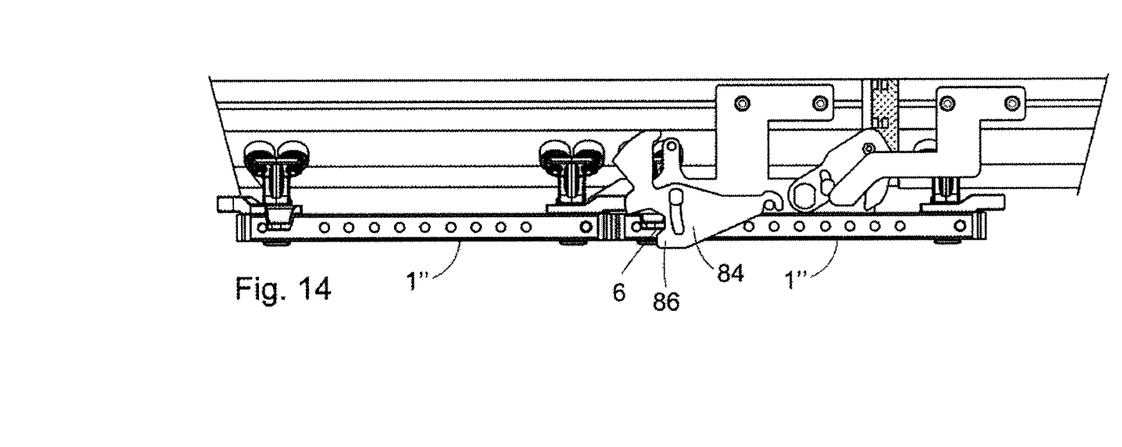

The fixed stop (88) mounted on the second section (3b) of the rolling track is responsible for abutting the end stop (82) to an inoperative position when the first section (3a) of the rolling track engages with the second section (3b) of the rolling track, as shown for example in FIGS. 13 and 14.

As can be seen in FIG. 12 when two or more crossbars are accessed from one or more crossbars (1a, 1b, 1c) coupled by the linking cams (6) to the end of the first section (3a) of a rolling track, said first section (3a) being separated from the second section (3b), the end stop (82) is found in an operative position, pivoting from the lower area, preventing the passage beyond the bolt (7) and, therefore, that the chains may leave the first section (3a) of the rolling track.

In FIG. 13, the first section (3a) of the rolling track is coupled with the second section (3b), which causes the end stop (82) to ascend by the fixed stop (88) to an inoperative position in which the bolt (7) releases from the first chain in circulation, allowing the advancement of the chains still connected by the rolling track.

Figure 15:
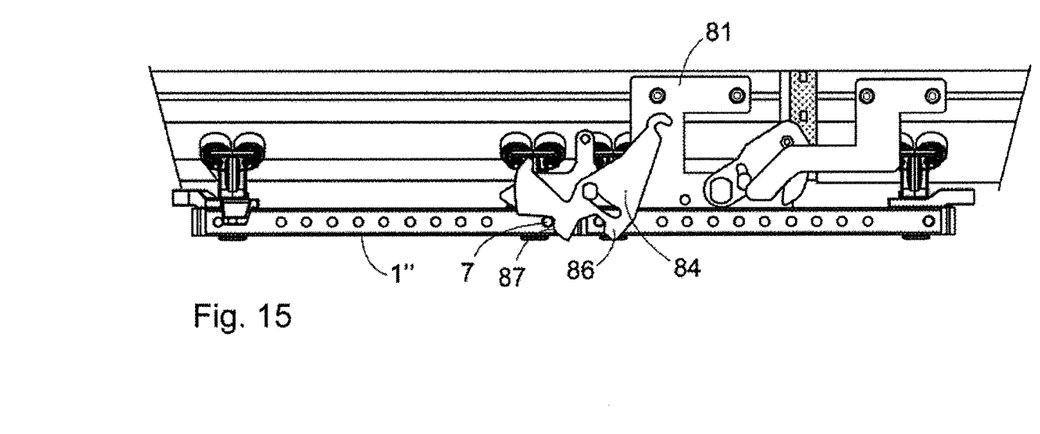

As can be seen in FIG. 14 during the advancement of the still-linked rosaries (1"), the linking cam (6) of the first chain, located to the right in the Figure, strikes the appendage (86), causing the abutment of the unlinking stop (84) to a stop position, shown in FIG. 15, in which said unlinking stop (84) causes the cam (6) of the first rosary (1") to be released and consequently the release of the second chain.

As can be seen in FIG. 15, once the two chains are disengaged, the second chain continues advancing due to inertia until its bolt (7) contacts the recess (87) of the unlinking stop (84) producing the second chain to be retained and stopped.

Figure 16:
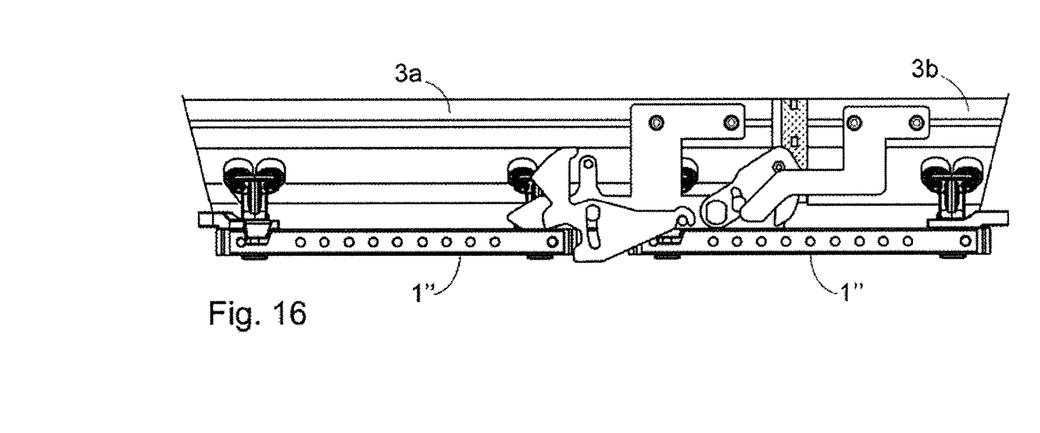

In FIG. 16 it can be seen how the first chain advances, once disengaged from the second chain, towards the second section (3b) of the rolling track.

Figure 17:
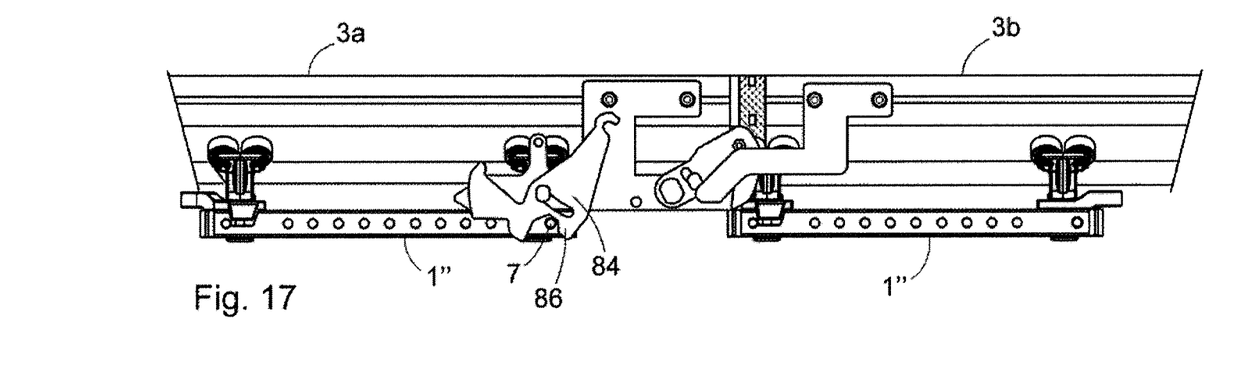

As seen in FIG. 17, in the event that the second chain (1"), located to the left of the image, tends to advance by inertia, the bolt (7) thereof contacts the appendage (86) causing rotation of the linking stop (84) to a stop position, wherein said linking stop prevents the advance from said bolt (7) of the second chain.

Figure 18:
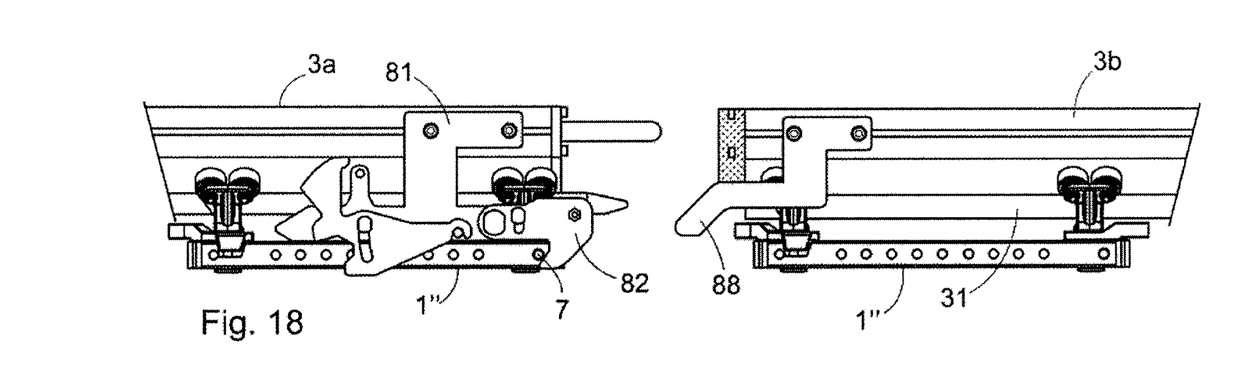

As can be seen in FIG. 18, when the first section (3a) of the rolling track moves away from the second section (3b), the end stop (82) returns to the operative position, preventing the advance of the bolt (7) of the second chain (1").

Having sufficiently described the nature of the invention, as well as an example of a preferred embodiment, it is hereby noted for the appropriate effects that the materials, shape, size and arrangement of the described elements may be modified, provided that this does not entail an alteration of the essential characteristics of the invention which are claimed below.

The invention claimed is:

1. A flexible manual storage system comprising:
   a rolling track configured to suspend plural movable workpiece chains;
   said plural movable workpiece chains comprising a variable number of metal tube crossbars comprising plural transverse openings from which parts can hang;
   one of said plural metal tube crossbars having a first end and a second end;
   the first end having arranged thereon:
      a linking cam; and
      a shock absorbing end part;
   the second end comprising:
      a support and stiffening tab arranged thereon; and
      a hinged metal part having an opening defined by a vertical axis and being fixed to the second end;
   plural rolling assemblies;
   one of said plural rolling assemblies comprising:
      a U-shaped section;
      at least one pair of support rollers configured to engage with a guide of the rolling track; and
      a vertical support shaft extending into the opening and connecting adjacent workpiece chains.

2. The system of claim 1, wherein the first end of one said plural metal tube crossbars is arranged opposite the first end of an adjacent other of said plural metal tube crossbars, wherein the vertical support shaft connects the second ends and functions as a hinge connecting together the hinged metal parts thereof.

3. The system of claim 1, wherein said plural metal tube crossbars comprise middle metal tube crossbars arranged between outer metal tube crossbars.

4. The system of claim 1, wherein at least one of said plural metal tube crossbars comprises a shock absorbing end part arranged on each opposite end.

5. The system of claim 1, wherein the vertical shaft engages with:
a pin; and
a support bushing.

6. The system of claim 1, further comprising a bolt arranged on the first end and functioning as a movement stop.

7. The system of claim 1, wherein the rolling track comprises:
a first section; and
a second section that can move relative to the first section, wherein the first and second sections are linkable and disengagable from one another.

8. The system of claim 1, further comprising a stopping and unlinking station configured to disengage adjacent sections of the rolling track,
wherein the stopping and unlinking station comprises:
a support fixed to one of the adjacent sections of rolling track;
a pivotally mounted end stop that can pivot between an operative position and an inoperative position;
a pivotally mounted unlinking stop having an appendage;
a detent; and
a fixed stop mounted on another of the adjacent sections of rolling track.

9. A flexible manual storage system comprising:
a rolling track configured to suspend plural metal tube crossbars having plural transverse openings from which parts can hang;
said plural metal tube crossbars forming a workpiece chain;
each of said plural metal tube crossbars having a first end and a second end;
the first end having arranged thereon:
a linking cam; and
a shock absorbing end part;
the second end comprising:
a support and stiffening tab arranged thereon; and
a hinged metal part having an opening defined by a vertical axis and being fixed to the second end;
plural rolling assemblies suspending the first and second ends of the metal tube crossbars to the rolling track; and
each of said plural rolling assemblies comprising:
a U-shaped section;
at least one pair of support rollers configured to engage with a guide of the rolling track; and
a vertical support shaft extending into the opening.

10. A flexible manual storage system comprising:
a rolling track comprising linkable and disengagable sections;
plural metal tube crossbars that each comprise plural transverse openings from which parts can hang;
each of said plural metal tube crossbars having a first end and a second end;
the first end having arranged thereon:
a linking cam; and
a shock absorbing end part;
the second end comprising:
a support and stiffening tab arranged thereon; and
a hinged metal part having an opening defined by a vertical axis and being fixed to the second end;
plural rolling assemblies suspending the first and second ends of the plural metal tube crossbars on the rolling track;
each of said plural rolling assemblies comprising:
a U-shaped section;
at least one pair of support rollers configured to engage with a guide of the rolling track; and
a vertical support shaft extending into the opening.

* * * * *